Aug. 16, 1938.     H. J. WILLOUGHBY     2,127,279
LUBRICATOR SHAKING JACK
Filed March 18, 1935
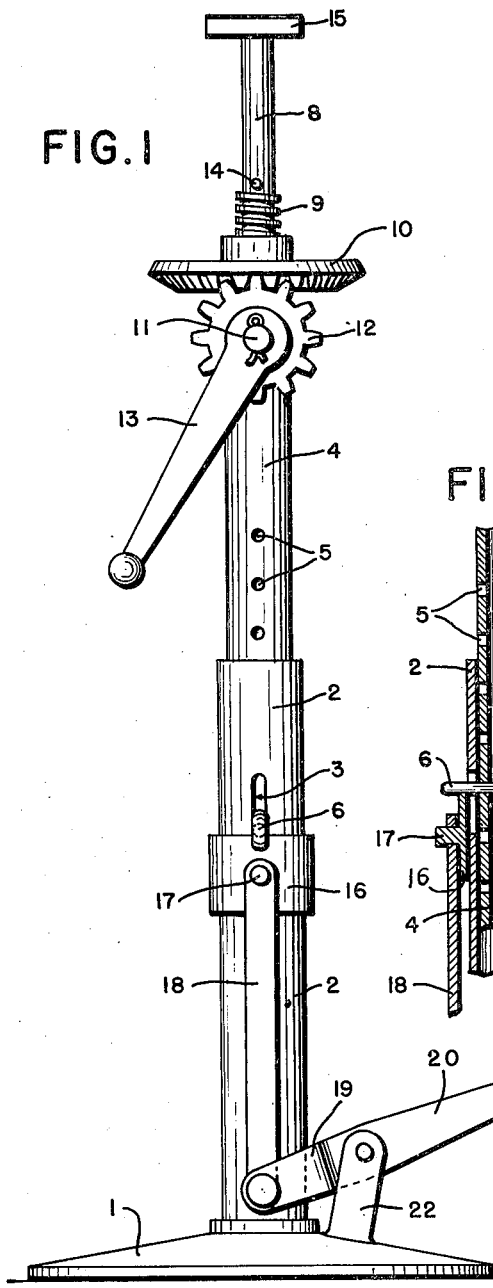
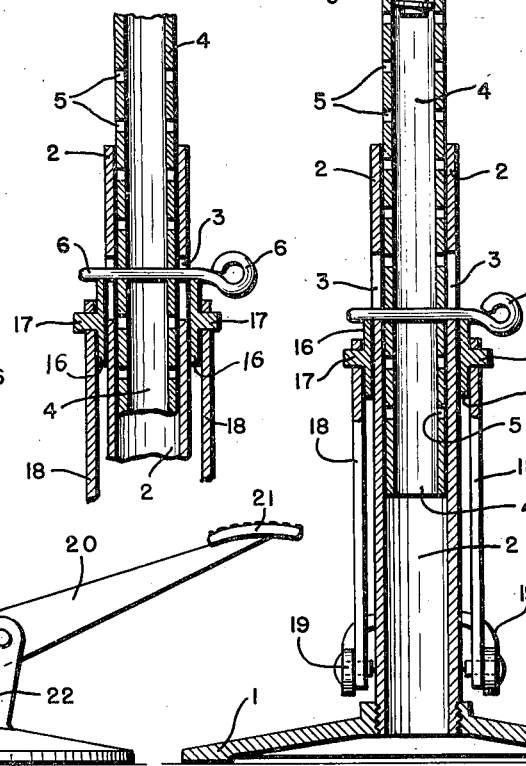
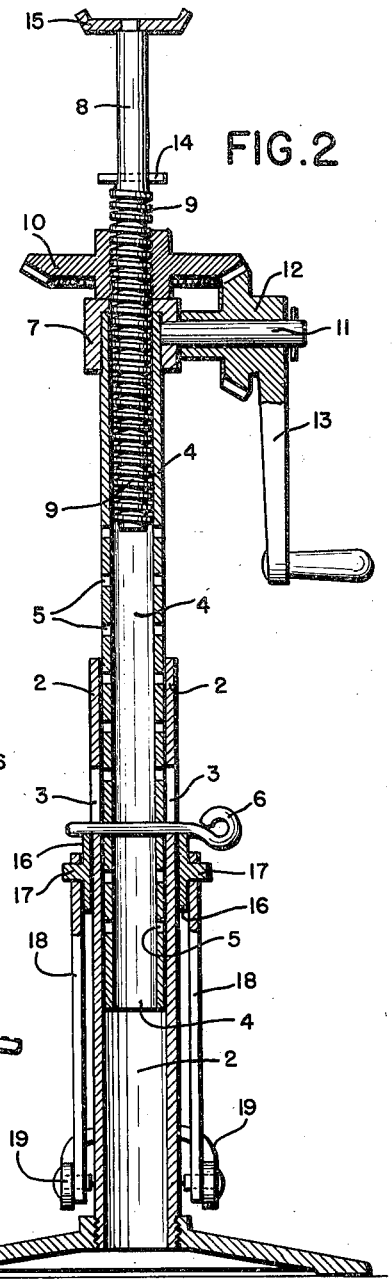
INVENTOR.
HOWARD J. WILLOUGHBY
BY Bohleber & Ledbetter
ATTORNEYS.

Patented Aug. 16, 1938

2,127,279

UNITED STATES PATENT OFFICE 2,127,279

LUBRICATOR SHAKING JACK

Howard J. Willoughby, Little Neck, N. Y.

Application March 18, 1935, Serial No. 11,704

15 Claims. (Cl. 73—51)

This invention relates to a motor vehicle shaking jack or what may be called a lubricator shaking jack. Such a device is for use in connection with the oiling and greasing of automobiles and is primarily designed for use in grease pits and with vehicle or car-raising lifts where the axles, bearings, and frame parts of the car are well above the bottom of a greasing pit, or well above the ground, to make room under the motor car for an operator and his greasing equipment.

An object of the invention is to provide a tall jack which is adjustable in its length to the height of the motor vehicle to be greased and oiled and has means enabling the jack to rock or shake the vehicle bearings and springs by the manual power of an operator to actuate a lever, in an easy and expeditious manner, say by his foot applied to a pedal. In this way, an operator can stand upright and work comfortably under a car with both hands free to handle the greasing apparatus for injecting grease under pressure into the bearings and springs while the latter are vibrated or shaken to move their parts in relation to each other. One man, therefore, can manually operate the shaking jack by his physical power while handling the greasing apparatus in the pit and under the car when the latter is raised on the lift without the necessity of removing the motor car from the pit or lift.

A further object of the invention is to provide a jack of considerable length or height as shown, and which not only is adjustable vertically, utilizing one or more adjustment means therefor, to initially change the height of the jack and to conveniently set it for cars of different heights, but is capable of repeating the vertical reciprocation or repeated vibration by pedal means, or other power means, employed in connection with rocking a vehicle to loosen so-called "frozen" joints and bearings, and to flex the spring leaves and loosen up bearing pins in their journals, so that the oil and grease will penetrate between the parts thereof when said grease is put under pressure to flow into said bearings.

Another object of the invention is to provide a vehicle lifting and lubricator shaking jack of the character set forth, that is simple and rugged in construction, inexpensive to manufacture, and extremely efficient in operation and service within a greasing pit or under a vehicle lift.

This invention also consists in certain other features of construction and operation, in the combination and arrangement of the several parts, to be hereinafter fully described, and as illustrated by way of example in the accompanying drawing.

In describing this invention in detail, reference will be had to the accompanying drawing, wherein like reference characters denote like or corresponding parts throughout the several views, and in which:

Figure 1 is a side elevation of the jack and shows an example of two adjustment means for preliminarily setting the jack to a proper height and under tension or slight pressure against cars of different heights, and shows a pedal for reciprocating the movable member of the jack to rock the car and shake the bearing parts in relation to each other.

Figure 2 is a vertical sectional view taken through Figure 1, and more clearly shows the two adjustment means.

Figure 3 is a fragmentary sectional view of the center portion of the jack shown in "up" position under the lifting force of a pedal or other operating means, while the other views show the jack in "down" position.

Referring to the drawing in detail, the reference numeral 1 indicates a base which may be of any suitable type, but is preferably of disk formation and upwardly flared toward its center. This appropriately large size and round or disk base 1 enables the tall jack to be tipped and rolled on its edge for easy handling, and provides a stand or base which is stable when operating the lubricator shaking jack.

A threaded opening may be formed in the base 1 for the purpose of threadedly receiving the lower end of a hollow standard 2 which projects vertically upward from the center of the base 1. However, the standard 2 may be fixed to the base 1 by other suitable means. The base and standard together form a stationary support 1, 2 on which the movable parts of the jack are operatively mounted. In this example of the invention, the standard 2 acts as a guide for operatively mounting one or more movable parts, as above indicated. The standard or guide 2 has provided therein, above its center, diametrically oppositely disposed slots 3 for a purpose which will be presently apparent.

Telescopically mounted in the standard 2 is a relatively long tube or movable member 4 which provides a long upward reach so that the jack is suitable for use in a pit or under a vehicle lift. This movable or reciprocable member 4 is adapted to operate vertically up and down in relation to its standard or guide 2. The member 4 is made with a long row of sockets or the like, such as the holes 5, arranged in pairs, with the holes or openings of each pair disposed diametrically opposite each other for cooperation with the slots 3. This row of holes extends upwardly from the lower end of the tube 4. Any one of a pair of holes 5 in the upright tube 4 is for the purpose of receiving a socket engaging part, such as a pin 6 with a handle or eye thereon, for disposal through the slots 3 and for thus bridging the standard 2 and holding the reciprocable upright part 4 at various elevations with respect to the base 1 and its standard 2 acting as a support for the movable parts of the jack.

The row of holes 5, together with the inserted pin 6 engaging the standard 2, provide one manual adjusting means for varying the height of the jack head or vehicle engaging saddle or plate 15 carried on the upper end of the reciprocable tube 4. The slots 3, with the pin 6 passing therethrough and through the holes 5 in the movable member 4, serve to prevent relative rotation between the latter and the standard or guide 2.

Another adjusting device, which may be a hand screw adjusting means, is carried by or secured to the upper end of the slidable or reciprocable member 4. This adjusting device preferably includes a collar 7 having an opening registering with the bore of the upright tube 4 for the purpose of receiving a screw lift or thrust rod 8. This lift rod 8 is threaded for a portion of its lower length to provide a screw 9 which is mounted to travel in the tube 4, as clearly shown in Figure 2. This additional adjusting device or means is also hand operated for conveniently and further adjusting the height of the shaking jack, and is useful in setting the upper end 15 under a little pressure against the vehicle.

Threadedly mounted on the screw portion 9 is a screw gear 10 which rests upon the collar 7. A shaft 11 is supported by and extends from the collar 7, which shaft has journalled thereon a bevel gear 12 meshing with the screw gear 10. The bevel gear 12 has formed thereon a crank handle 13, so that upon rotating this handle, the lift rod 8 is raised and lowered, as will be apparent. This screw rod 8, 9 provides a second manual adjustment for the shaker jack, and the combined length of the base support 1, 2 and its slidable member 4 is such that the jack head 15 will reach upwardly, either from the bottom of a greasing pit or from the ground under a car lift, to a car above said pit or to a car upon said lift.

In order to limit the downward movement of the screw lift rod 8, a stop pin 14 is provided which projects through the rod to contact with the screw gear 10. The suitably shaped head or car engaging part 15 is secured to the upper end of the lift rod 8 for the purpose of engaging portions of a vehicle, as will be apparent.

In order to bring about the rocking action for the vehicle through the instrumentality of this jack, the reciprocable tube or slidable member 4, with the lift rod 8, is capable of being reciprocated within the limits of the slots 3 by any suitable operating means. For this purpose, a collar 16 is provided which surrounds the standard 2 and is slidable thereon. The collar has bearing studs 17 extending therefrom. These studs 17 have secured thereto and depending therefrom a pair of links 18 which are disposed upon opposite sides of the standard.

Arms 19 of the forked end of a pedal 20 are pivotally secured to the lower ends of the links 18, and the free end of the outstanding pedal 20 has a foot plate 21. Secured to and rising from the base 1 is a bracket 22, and the pedal 20 is pivotally secured to the bracket adjacent to the forked end 19 thereof, as clearly shown in Figure 1, thus affording a long lever arm 20' for the pedal 21. Any suitable operating connection between the pedal 20 and the movable member 4 is contemplated. This reciprocating jack drops back or returns to its lowermot position each time the operator releases his leg power from the pedal.

From the above description and disclosure of the drawing, it will be obvious that there is provided a lifting and shaking jack that is primarily designed for use in grease pits and under vehicle lifts for rocking a vehicle to loosen "frozen" joints and to separate parts thereof in order to allow the grease and oil to pass between the parts. In the use of this jack, the reciprocating section 4 is preliminarily elevated by hand to the desired height, and the pin 6 is then placed in the proper openings 5 and slots 3.

Next, the crank handle 13 is rotated for disposing the head 15 in contact with the desired part of the vehicle and for putting some or all of the weight of the vehicle on the jack, as desired. The pedal 20 can then be put into action for rocking the vehicle by foot power for the purpose set forth.

By the use of the foot pedal 20 to actuate this reciprocating jack, it will be apparent that the hands of the operator will be free for handling the grease gun or other greasing and oiling apparatus generally employed in greasing and oiling vehicles.

It will be noted that for quickly jacking up a car, the shaking jack may also be used in a manner now to be described. The pin 6 can first be removed from the holes 5 and slots 3, whereupon the reciprocable tube 4 is raised into as close proximity with the car as is possible with the spacing of the holes 5. The pin 6 is then reinserted through the slots 3 and holes 5, thus holding the member 4 in its preliminarily adjusted position. The pedal 20 is then depressed which raises the movable member 4, thus jacking up the car, and at the same time some of the holes 5, which theretofore were below the level of the top edge of the standard or guide 2, are then lifted into view above the top of the said standard. By inserting another pin 6, or even a nail, through such now visible holes 5, which nail now engages or rests on the top of the standard 2, the movable member 4 remains in this elevated or raised position. The movable collar 16 may be lowered and the pin 6 (shown in the drawing) be removed and reinserted through the slots 3 and holes 5, whereupon the movable member 4 may then be reciprocated at this raised level for shaking the car bearings or springs while greasing or oiling the same.

The pedal 20 is not only long enough to afford a good reciprocating leverage, but is also sufficiently long so that two or at most three positions of the jack on the ground suffice to grease and oil all bearings and springs merely by selecting the proper position for the jack and then swinging it with the pedal 21 around towards the position where the operator must stand to reach car parts and bearings being greased or oiled while he is holding the grease gun. The jack readily turns around on its disk-like base 1.

This type of lubricator shaking jack can be conveniently used, when lubricating vehicle shackle bearings and the like, and spraying springs, etc., by so adjusting the jack as to set the upper end 15 thereof a short distance below the automobile frame. The jack can, of course, be set against the automobile frame, preferably against some part of the body above the springs and axle. In either case, less physical effort is needed to shake the car than if the jack were applied directly to the axle. Most greasing operations may be effected without shaking the vehicle axle and the wheel or wheels, and consequently there is less load to shake and less inertia to overcome when the upper end 15 of the jack acts on some part of the vehicle other than its axle.

More particularly, when shaking the body of the car, if the top of the jack is positioned below the frame of the car, just out of contact therewith, and then reciprocated, the weight of the car body coming down will carry it below its normal stationary level. The lubricator shaking jack permits this action when initially set just below the car frame. This latter manner of use permits complete flexing of the springs and full movement of the shackle bearings by simulating vibration received naturally in riding over rough roads.

In order, however, to loosen and grease king pin bearings, the car weight or part thereof is lifted off of the front wheel or wheels by applying the jack to the axle. The jack has a variety of applications and uses, and the operator may place the upper end 15 of the jack against any portion of the car he desires.

It is thought from the foregoing description that the advantages and novel features and new mode of operation of this invention will be readily apparent.

It is to be understood that changes can be made in the construction and in the combination and arrangement of the several parts comprising this invention without departing from the principles thereof.

What is claimed is:

1. A vehicle lifting and shaking jack comprising, in combination, a base, a hollow standard rising therefrom, means telescopically received in the standard and mounted for reciprocation therein, means including a pin bridging the standard for holding the telescopically mounted means at various elevations with respect to the standard, headed lifting means mounted in the telescopically mounted means, and means for vertically adjusting the headed lifting means relatively to the telescopically mounted means, said pin having limited vertical movement with respect to the standard, and means engageable with the pin for reciprocating the telescopically mounted means relatively to the standard.

2. A vehicle lifting and shaking jack comprising, in combination, a base, a hollow standard secured to and rising therefrom, means telescopically mounted in the standard and having openings arranged in pairs therein, said standard having registering slots therein, a pin for disposal through any one of the pairs of openings and the slots respectively for holding the telescopically mounted means at various elevations with respect to the standard, headed lifting means mounted in the telescopically mounted means, means for vertically adjusting the lifting means relatively to the telescopically mounted means, a pedal, and means engageable with the pin and connected with the pedal for moving the pin in the slots to reciprocate the telescopically mounted means.

3. A vehicle lifting and shaking jack comprising, in combination, a base, a hollow standard secured to and rising therefrom and having vertical slots diametrically disposed therein, a tube telescopically mounted in the standard and having oppositely disposed openings arranged in pairs, a pin for disposal through any one pair of openings and the slots respectively for holding the tube at different elevations with respect to the standard, a headed lift rod mounted in the tube, screw means for varying the height of the lift rod relatively to the telescopically mounted tube, a collar surrounding the standard and engageable with the pin, a pedal, and links connecting the pedal with the collar to reciprocate the tube through the medium of the slots and pin.

4. A portable shaking jack for lifting a motor vehicle and shaking the bearings and springs thereof over a pit or upon a car-raising lift comprising, in combination; a support including a base, and a standard rising therefrom; movable means mounted upon said standard and adapted to reciprocate vertically and relatively thereto and the upper end of which is adapted to engage a vehicle to shake it; an adjusting device for conveniently changing the height of the movable means to initially set the shaking jack to cars of different heights or to parts of different heights on the same car; the combined length of the support and movable means being great enough to reach from the bottom of a pit to the car or from the ground to the raised level of the car on a car lift; and a pedal pivoted on the support close to the ground and operatively connected with the movable means to reciprocate the latter a predetermined extent to rock the vehicle and relatively move its bearings during the greasing and oiling thereof, the movable means returning freely to its lower position from any position to which it is raised by the pedal while reciprocating the movable means, the pedal having an operating leverage sufficient to reciprocate the movable means and a car supported thereon by an operator so that he may shake the car bearings by foot power while his hands are free to handle his greasing apparatus.

5. A portable shaking jack for lifting a motor vehicle and shaking the bearings and springs thereof over a pit or upon a car-raising lift comprising, in combination; a support including a base, and a hollow standard rising therefrom; a slidable member carried within said standard and adapted to reciprocate vertically and relatively therein, and the upper end of which is adapted to engage a vehicle; an adjusting device associated with the upper portion of the slidable member and thus located substantially high above the base for conveniently changing the height of said slidable member to initially set the jack to cars of different heights or to parts of different heights on the same car; the adjusted length of the slidable member being great enough to reach from the bottom of a pit to the car or from the ground to the raised level of the car on a car lift; and a pedal pivoted on the support close to the ground and operatively connected with the slidable member to reciprocate the latter a predetermined extent to rock the vehicle and relatively move its bearings during the greasing and oiling thereof, the slidable member returning freely to its lower position from any position to which it is raised by the pedal while reciprocating the slidable member, the pedal having an operating leverage sufficient to reciprocate the slidable member and a car supported thereon by an operator so that he may shake the car bearings by foot power while his hands are free to handle his greasing apparatus.

6. A portable shaking jack for lifting a motor vehicle and shaking the bearings and springs thereof over a pit or upon a car-raising lift comprising, in combination; a support including a base, and a standard rising therefrom; a member slidable upon said standard and adapted to reciprocate vertically and relatively thereupon, and the upper end of which is adapted to engage a vehicle; and an adjusting device for conveniently changing the height of the slidable member to initially set the jack to cars of different heights or to parts of different heights on the same car including a plurality of spaced sockets carried by the slidable member, and a socket engaging part carried by the standard; the combined length of the support and slidable member being great enough to reach from the bottom of a pit to the car or from the ground to the raised level of the car on a car lift; and a pedal pivoted on the support close to the ground and operatively connected with the slidable member to reciprocate the latter a predetermined extent to rock the vehicle and relatively move its bearings during the greasing and oiling thereof, the slidable member returning freely to its lower position from any position to which it is raised by the pedal while reciprocating the slidable member, the pedal having an operating leverage sufficient to reciprocate the slidable member and a car supported thereon by an operator so that he may shake the car bearings by foot power while his hands are free to handle his greasing apparatus.

7. A portable shaking jack for lifting a motor vehicle and shaking the bearings and springs thereof over a pit or upon a car-raising lift comprising, in combination; a support including a base, and a standard rising therefrom; means slidable upon said standard and adapted to reciprocate vertically and relatively thereto, and the upper end of which is adapted to engage a vehicle; an adjusting device for conveniently changing the height of the slidable means to initially set the shaking jack to cars of different heights or to parts of different heights on the same car; the combined length of the support and slidable means being great enough to reach from the bottom of a pit to the car or from the ground to the raised level of the car on a car lift; and a pedal pivoted on the support close to the ground and operatively connected with the adjusting device to reciprocate the slidable means therethrough a predetermined extent to rock the vehicle and relatively move its bearings during the greasing and oiling thereof, the slidable means returning freely to its lower position from any position to which it is raised by the pedal while reciprocating the slidable means, the pedal having an operating leverage sufficient to reciprocate the slidable means and a car supported thereon by an operator so that he may shake the car bearings by foot power while his hands are free to handle his greasing apparatus.

8. A portable shaking jack for lifting a motor vehicle and shaking the bearings and springs thereof over a pit or upon a car-raising lift comprising, in combination; a support including a base, a standard rising therefrom and a vertically extending slot in the standard; slidable means guided by said standard and adapted to reciprocate vertically and relatively thereto, and the upper end of which is adapted to engage a vehicle to shake it; an adjusting device for conveniently changing the height of the slidable means to initially set the shaking jack to cars of different heights or to parts of different heights on the same car including a plurality of spaced holes in the slidable means, and an adjusting pin passing through the slot and one of the spaced holes; the combined length of the support and slidable means being great enough to reach from the bottom of a pit to the car or from the ground to the raised level of the car on a car lift; and a pedal pivoted on the support close to the ground and operatively engaging the pin to reciprocate the slidable means a predetermined extent to rock the vehicle and relatively move its bearings during the greasing and oiling thereof, the slidable means returning freely to its lower position from any position to which it is raised by the pedal while reciprocating the slidable means, the pedal having an operating leverage sufficient to reciprocate the slidable means and a car supported thereon by an operator so that he may shake the car bearings by foot power while his hands are free to handle his greasing apparatus.

9. A shaking jack for lifting and shaking bearings and springs of a motor vehicle over a pit or upon a car-raising lift comprising, in combination; a support including a base, and means providing a standard rising therefrom; movable means guided by said standard and adapted to reciprocate relatively thereto; a first adjusting means carried by the support and by the movable means to preliminarily adjust the vertical position thereof relatively to the standard to initially set the jack for cars of different heights; a second adjusting means associated with the movable means to provide a secondary adjustment to set the jack under pressure or tension against a part of the car in making ready to shake its bearings; and a pedal pivoted on the support and operatively connected with the movable means to reciprocate the latter a limited extent so that an operator can rock the car bearings by foot power during the greasing and oiling thereof by hand.

10. A shaking jack for lifting and shaking bearings and springs of a motor vehicle over a greasing pit or upon a car-raising lift comprising, in combination; a support including a base, and a standard rising therefrom; a long upright member guided by said standard, reaching upwardly to the vehicle to be shaken, and adapted to reciprocate relatively to and within said standard; a first adjusting means cooperating with the movable member and with the standard to partly adjust the vertical position and height of said movable member to vehicles and the bearings thereon of different heights; a second adjusting means associated with the movable member to provide a secondary adjustment to complete the setting of the jack in making ready to shake said bearings; and a pedal pivoted on the support and operatively connected through the first adjusting means with the movable member to reciprocate the latter a limited extent so that an operator can rock the car bearings by foot power during the greasing and oiling thereof by hand.

11. A shaking jack to vibrate vehicle bearings while greasing them comprising, in combination, an upright stationary standard rising from a base resting on the ground; two upright reciprocable members movably guided by the standard, one of which members is adapted to be projected far above the upper end of said standard, and also above the upper end of said other reciprocable member, to reach a vehicle over a greasing pit, or on a car lift, to engage and shake said vehicle, and which is adjustable up and down in relation to the other reciprocable member, by which to adjust the vertical height of the two members and hence adapt the shaking jack to pits of different depths, or to car lifts of different heights, and also to vehicle bearings of different locations; there being a series of spaced socket means made in a long row, in and beginning proximate the lower end of that reciprocable member which engages the vehicle aforesaid, and extending upwardly therealong; a socket-engaging means cooperating with the socket means, and with the other reciprocable member, to connect together said two reciprocable members after the vertical height has been adjusted as aforesaid; and a pedal fulcrumed on the lower end of the jack above the base, with a short lever arm operatively connected to the said other reciprocable member to actuate both members successively and repeatedly upwardly and then drop them back to a down position, and also having a long lever arm extending outwardly over the base with a foot piece on the outer end thereof, whereby an operator can stand under a vehicle with both hands free to handle his greasing apparatus, and use his foot to reciprocate the jack.

12. A shaking jack to actuate the bearings of a vehicle while greasing same comprising, in combination, a support including a base adapted to rest on the ground with a stationary vertical standard rising from said base, said standard being provided with a slot longitudinally formed therein of a length equal to at least the movement to be imparted to the vehicle bearings when shaking them during greasing, a first reciprocable member slidable up and down on the outside of the standard and having its upper end normally proximate the lower end of the slot, operating means mounted on the support and operatively connected with the first reciprocable member to actuate the latter up and down along the slot and return or drop said member to down position after each actuation, a second reciprocable member slidable up and down within the standard and extending below the slot and having a long upper end adapted to reach upwardly to the vehicle high thereabove, there being a series of closely spaced holes formed through the second reciprocable member and adapted to register successively with the slot, said series of spaced holes beginning proximate the lower end of the second reciprocable member and extending upwardly therealong, and a connecting pin removably introduced through the slot of the stationary standard and in engagement with the upper end of the first reciprocable member and through one of the holes of the second reciprocable member to maintain the latter in an upwardly adjusted position adapting its upper end to engage the vehicle, the up and down travel aforesaid of the first reciprocable member along the slot serving to actuate the pin in said slot and hence the second reciprocable member to shake the vehicle.

13. A lubricator shaking jack for use in connection with a motor vehicle placed over a greasing pit, or upon a car-raising lift, said shaking jack having a long upper reach for actuating the chassis bearings and the body springs of said motor vehicle, to facilitate the greasing of said bearings and springs, comprising, in combination; a support including a vertical guide rising from a base resting on the ground surface under a motor vehicle body high thereabove, said base being made of a size sufficient to maintain said long reach jack in a stable upright operating position; a long upright reciprocable member having its lower end slidably cooperating with the vertical guide, and its upper end held in upright position by the support and stable base; a handscrew adjusting means carried at the upper end of the reciprocable member for conveniently adjusting the height of the shaking jack, to initially set the upper end thereof to engage a chassis part or the springs and bearings located at different heights on motor vehicles; the combined length of the reciprocable member and the hand-screw adjusting means being sufficiently long to reach upwardly from the base on the ground surface to a vehicle body thereabove; and means to actuate the reciprocable member including a pedal mounted on the support conveniently close to the ground and the foot of an operator, said pedal extending laterally outward over the base and cooperating with the reciprocable member, to actuate it through a short stroke and rock the vehicle body above its axles and readily flex its springs and shake its bearing parts while the lubricant is applied under pressure thereto; the reciprocable member returning freely to its down position from any height to which it is raised each time the operator's foot thrust on the pedal is released, to render convenient repeated relative motion of the bearing parts while the lubricant is being applied; and the laterally extending pedal having an operating leverage sufficient to enable an operator to readily actuate the reciprocable member by foot power, thereby shaking the motor vehicle chassis while his hands are free to handle his greasing apparatus.

14. A portable shaking jack for vibrating a motor vehicle and shaking the bearings and springs thereof over a greasing pit or upon a car-raising lift comprising, in combination; a support formed by a base and a central upright member thereon; movable means operatively guided by the upright member and adapted to reciprocate vertically and relatively thereto and the upper end of which is adapted to engage a vehicle to shake it; an adjusting device associated with the movable means for conveniently changing the operating length of said movable means to a suitably adjusted height to initially set the shaking jack to cars of different heights or to parts of different heights on the same car; the adjusted length and height of the movable means being great enough to reach upwardly from the bottom of the greasing pit to a car thereabove, or from the ground to the raised level of a car on the car-raising lift; and a pedal pivoted on the shaking jack close to the ground and operatively connected with the movable means to reciprocate the latter a predetermined extent to rock or vibrate the vehicle and relatively move its bearings during the greasing and oiling thereof, the movable means returning freely to its down position from any position to which it is raised by the pedal while reciprocating said movable means, the pedal having an operating leverage sufficient to reciprocate the movable means and rock a car resting thereon by an operator so that he may shake the car bearings by foot power while his hands are free to handle his greasing apparatus applied to said bearings.

15. A portable shaking jack for lifting a motor vehicle and shaking the bearings and springs thereof over a pit or upon a car-raising lift comprising, in combination; a support including a base, and a standard rising therefrom; movable means mounted upon said standard and adapted to reciprocate vertically and relatively thereto and the upper end of which is adapted to engage a vehicle to shake it; an adjusting device for conveniently changing the height of the movable means to initially set the shaking jack to cars of different heights or to parts of different heights on the same car; the combined length of the support and movable means being great enough to reach from the bottom of a pit to the car or from the ground to the raised level of the car on a car lift; and a lever pivoted on the support and operatively connected with the movable means to reciprocate the latter a predetermined extent to rock the vehicle and relatively move its bearings during the greasing and oiling thereof, the movable means returning freely to its lower position from any position to which it is raised by the lever while reciprocating the movable means, the lever having an operating leverage sufficient to reciprocate the movable means and a car supported thereon by an operator.

HOWARD J. WILLOUGHBY.